United States Patent
Naiman (10) Patent No.: US 8,207,699 B2
(45) Date of Patent: Jun. 26, 2012

(54) METHOD AND APPARATUS FOR AC MOTOR CONTROL

(75) Inventor: Arthur Naiman, Jerusalem (IL)

(73) Assignee: InnoSave Ltd., Kfar Saba (IL)

( * ) Notice: Subject to any disclaimer, the term of this patent is extended or adjusted under 35 U.S.C. 154(b) by 506 days.

(21) Appl. No.: 12/499,236

(22) Filed: Jul. 8, 2009

(65) Prior Publication Data

US 2011/0006709 A1    Jan. 13, 2011

(51) Int. Cl.
*H02P 27/04* (2006.01)
(52) U.S. Cl. ........ 318/800; 318/148; 318/801; 363/148; 363/9; 363/127; 363/157; 363/154; 310/160; 310/159; 320/123; 323/217; 323/223; 329/315; 329/345
(58) Field of Classification Search ............... 363/148, 363/9, 127, 157, 154; 310/160, 159; 329/315, 329/345; 318/800, 801, 148; 320/123; 323/217, 323/223

See application file for complete search history.

(56) References Cited

U.S. PATENT DOCUMENTS

| | | | |
|---|---|---|---|
| 1,902,444 A | 3/1933 | Hobart | |
| 2,707,258 A | 4/1955 | Boyer | |
| 3,571,689 A * | 3/1971 | Wise | 388/819 |
| 3,611,104 A * | 10/1971 | Jalal et al. | 318/800 |
| 3,667,012 A * | 5/1972 | Kilgore | 318/161 |
| 3,671,831 A * | 6/1972 | Chausse et al. | 318/800 |
| 3,731,169 A | 5/1973 | Burgholte et al. | |
| 3,790,873 A * | 2/1974 | Witten | 318/800 |
| 3,889,167 A * | 6/1975 | Tanaka et al. | 318/809 |
| 3,900,779 A | 8/1975 | Kondratenko | |
| 3,946,293 A | 3/1976 | Feld | |
| 3,959,720 A * | 5/1976 | Bose et al. | 323/207 |
| 3,982,168 A * | 9/1976 | Bose et al. | 363/173 |
| 4,061,957 A | 12/1977 | Vader | |
| 4,074,174 A | 2/1978 | Kuge | |
| 4,272,706 A | 6/1981 | Somerville | |
| 4,310,791 A * | 1/1982 | Akamatsu | 318/800 |
| 4,425,539 A | 1/1984 | Wills | |
| 4,426,610 A | 1/1984 | Kawada | |
| 4,471,281 A | 9/1984 | Uezumi et al. | |
| 4,670,826 A | 6/1987 | Tanaka | |
| 4,750,098 A * | 6/1988 | Heinrich et al. | 363/10 |
| 4,771,224 A | 9/1988 | Elms | |

(Continued)

FOREIGN PATENT DOCUMENTS

CN    201188599 Y    1/2009
(Continued)

OTHER PUBLICATIONS

International Search Report for PCT/IL2010/000544 by European Patent Office mailed Jan. 31, 2011.

(Continued)

*Primary Examiner* — Rita Leykin
(74) *Attorney, Agent, or Firm* — Simon Kahn (57) ABSTRACT

An alternating current motor control system constituted of: a control unit; a cycloconverter functionality; a phase control functionality; and a semiconductor switching unit comprising a plurality of electronically controlled semiconductor switches each associated with a particular winding of a target alternating current motor and each independently responsive to the control unit. In one embodiment the semiconductor switching unit is arranged to connect the windings of the target alternating current motor to a three phase power input in one of a star and a delta configuration responsive to the control unit.

20 Claims, 8 Drawing Sheets

U.S. PATENT DOCUMENTS

| | | | |
|---|---|---|---|
| 4,777,581 A | 10/1988 | Smith | |
| 4,792,741 A * | 12/1988 | Matsuo et al. | 318/800 |
| 5,159,539 A | 10/1992 | Koyama | |
| 5,189,603 A | 2/1993 | Sashida et al. | |
| 5,331,303 A | 7/1994 | Shiota | |
| 5,483,111 A | 1/1996 | Kuznetsov | |
| 5,969,966 A * | 10/1999 | Sawa et al. | 363/163 |
| 6,118,932 A * | 9/2000 | Maurio et al. | 388/811 |
| 6,198,238 B1 * | 3/2001 | Edelson | 318/148 |
| 6,351,397 B1 * | 2/2002 | Sawa et al. | 363/50 |
| 6,493,924 B2 | 12/2002 | Das | |
| 6,683,428 B2 | 1/2004 | Pavlov | |
| 6,847,185 B2 | 1/2005 | Kume | |
| 6,922,037 B2 * | 7/2005 | Edelson | 318/801 |
| 6,969,922 B2 * | 11/2005 | Welches et al. | 290/1 A |
| 7,084,524 B2 * | 8/2006 | Lacaze et al. | 307/3 |
| 7,102,331 B2 * | 9/2006 | Walter et al. | 322/8 |
| 7,180,270 B2 | 2/2007 | Rufer | |
| 7,474,074 B2 | 1/2009 | Hoemann | |
| 8,134,331 B2 * | 3/2012 | Rozman et al. | 318/800 |
| 2006/0214645 A1 | 9/2006 | Rufer | |
| 2008/0116839 A1 | 5/2008 | Hoemann | |
| 2008/0291698 A1 | 11/2008 | Yamamoto et al. | |

FOREIGN PATENT DOCUMENTS

| | | | |
|---|---|---|---|
| DE | 4335917 | | 1/1999 |
| EP | 0186513 | B1 | 7/1986 |
| EP | 0364589 | A1 * | 4/1990 |
| EP | 0364589 | A1 | 4/1990 |
| EP | 0422221 | A1 | 4/1991 |
| EP | 0852425 | A1 | 7/1998 |
| EP | 0852425 | B1 | 5/2003 |
| GB | 1200250 | | 7/1970 |
| GB | 1246970 | | 9/1971 |
| GB | 1267939 | | 3/1972 |
| GB | 1372092 | | 10/1974 |
| GB | 1402462 | | 8/1975 |
| GB | 2120422 | | 11/1983 |
| JP | 58215980 | | 12/1983 |
| JP | 58170391 | | 11/1985 |
| JP | 01-318567 | * | 12/1989 |
| JP | 1318567 | | 12/1989 |
| JP | 04-033591 | * | 2/1992 |
| JP | 4033591 | | 4/1992 |
| JP | 2005-143266 | | 2/2005 |
| WO | 87/01529 | A1 | 3/1987 |
| WO | 99/52202 | A1 | 10/1999 |

OTHER PUBLICATIONS

Written Opinion of the International Searching Authority for PCT/IL2010/000544 by European Patent Office mailed Jan. 31, 2011.

D. Naunin; Journal of Electrical Engineering, Abstract of "Star-Delta Switching Performance During the Starting of an Induction Motor"; Springer Berlin/ Heidelberg, Germany, vol. 64, No. 1-2, Jan. 1981.

* cited by examiner

METHOD AND APPARATUS FOR AC MOTOR CONTROL

TECHNICAL FIELD

The invention relates generally to the field of alternating current motors, and in particular to a method and apparatus enabling low cost control of a three phase alternating current motor.

BACKGROUND

AC motors for industrial applications typically exhibit a plurality of windings and operate on three phases of electricity. Generally speaking the windings are arranged symmetrically and connected to the three phases of electricity either in a delta configuration or a star configuration, with the star configuration also known as a Wye configuration. In the delta configuration, the finish of each winding is connected to the start of the next winding. In the star configuration, one end of all of the three windings are connected together. The delta configuration exhibits an increased current through the motor windings as compared to the star configuration, and thus the star configuration is typically used for direct line connected motor start up so as to avoid power source overloads. Once the motor has started up, the windings are switched to a delta configuration either through an open transition in which power to the motor is removed for a period of time surrounding the transition to avoid contact arcing or through a closed transition where power remains connected to the motor during the transition, typically through the use of added load resistors.

Soft starters were developed to replace the traditional star-delta motor startup, and typically operate by reducing the voltage delivered to the motor during the start up phase. Once the start up phase is complete the soft starter is disconnected from the motor, and the motor is connected directly to the grid. Additionally, soft starters do not support energy savings during operation, nor do they provide an efficient means of braking since they do not participate in slowing down the motor when braking is required. The start up period is extended and peak power consumption during the start up period is excessive.

A frequency converter, which converts the incoming AC line power to a DC voltage, and then reconverts the DC to an AC voltage at a variable output frequency and voltage, provides both rotational speed control and soft starting. Since the actual speed of the motor is dependent on the received power frequency, voltage and load, by adjusting the output frequency fed to the AC motor the speed of the AC motor is controlled. Advantageously a frequency converter can support smooth operation of an AC motor over a continuous broad range of speeds, including speeds down to ⅒ nominal and below. A frequency converter avoids the need for star delta switching or a soft starter by instead starting the motor with a low frequency and low voltage output. Unfortunately, frequency converters are expensive and bulky, and many motors do not require such a broad range of control.

A cycloconverter converts an input AC waveform to an output AC waveform of a different frequency, without requiring an intermediate DC conversion, by synthesizing the output AC waveform from segments of the input AC waveform. Cycloconverters are most often found in very high power output systems such as variable frequency drives exhibiting ratings of several megawatts. The operation of cycloconverters are well known and are available commercially from, among other companies, Siemens AG, Germany.

There is thus a long felt need for a method and apparatus which provide low cost controlled starting, rotational speed control, regenerative braking and power reduction.

SUMMARY OF THE INVENTION

In view of the discussion provided above and other considerations, the present disclosure provides methods and apparatus to overcome some or all of the disadvantages of prior and present methods of motor control. This is accomplished in certain embodiments by providing a control unit, a semiconductor switching unit, a cycloconverter functionality and a phase control functionality.

During start up, the control unit is arranged to preferably set the semiconductor switching unit to connect the target AC motor winding in a delta configuration, and soft starting is accomplished by the cycloconverter functionality building up the frequency provided to the target AC motor.

After the start up phase is complete, and the motor has reached a predetermined percentage of the nominal rotational speed, the control unit is arranged to determine, responsive to a monitored current, whether the motor current or static load torque is in within a predetermined range of a nominal value, and responsive thereto to select one of two operating modes: a first operating mode where the semiconductor star/delta switching unit is set to maintain the delta configuration; and a second operating mode where the semiconductor switching unit is set to connect the target motor in a star configuration.

Responsive to a predetermined condition of the relative torque, the semiconductor switching unit is preferably set to the star configuration, and optionally phase control functionality is further enabled to reduce power consumption. In the event that the semiconductor switching unit is set to the delta configuration, phase control functionality is preferably enabled to reduce energy unit. In one embodiment energy is reduced responsive the calculated relative torque and the relative current. In another embodiment energy is reduced responsive to the calculated load angle, i.e. the angle between the EMF vector of the stator and the phase current vector of the stator.

In the event that a change in rotational speed is requested, the control unit is preferably operative to control the semiconductor switching unit responsive to the cycloconverter functionality, until the target rotational speed is achieved.

In one embodiment, a voltage sensor and current sensors are provided for at least two of the three phases of input power, and each of motor torque and rotational speed is calculated responsive to the provided voltage and current sensors. In one embodiment a filter is further provided to increase motor efficiency during operation at rotational frequency less than nominal.

Additional features and advantages of the invention will become apparent from the following drawings and description.

BRIEF DESCRIPTION OF DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
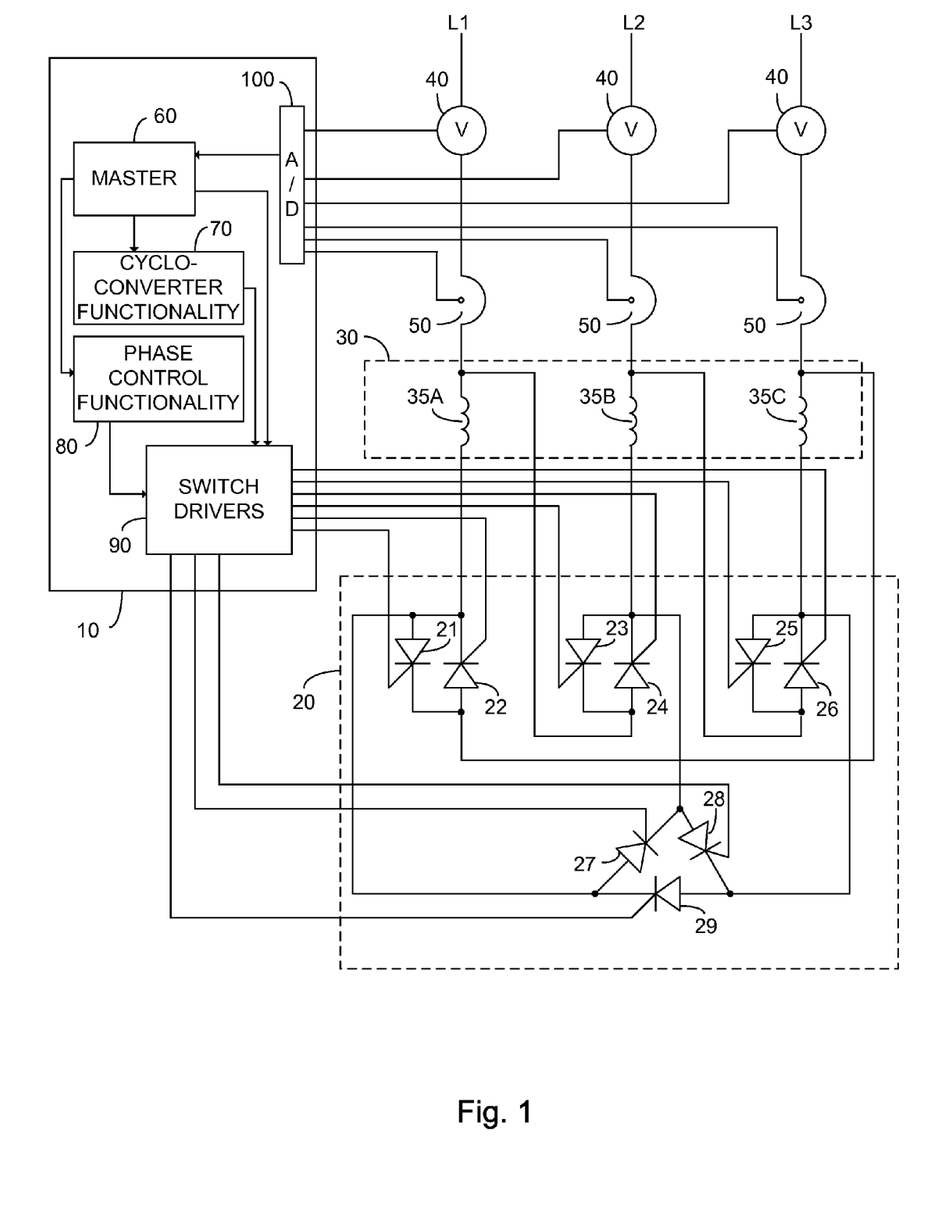
FIG. 1 illustrates a high level schematic diagram of an embodiment of a system comprising an alternating current motor controller.

FIG. 1 illustrates a high level schematic diagram of a system comprising: a source of three phase electricity, the phases respectively denote L1, L2 and L3; an alternating current motor controller 10; a semiconductor switching unit 20 comprising a plurality of semiconductor switches, illustrated without limitation as thyristors, and denoted respectively thyristors 21, 22, 23, 24, 25 26, 27, 28 and 29; an AC motor 30 constituted of at least three windings 35, denoted respectively 35A, 35B and 35C, each associated with one of the three phases; a plurality of voltage sensors 40; and a plurality of current sensors 50. Alternating current motor controller 10 comprises: a master control unit 60; a cycloconverter functionality 70; a phase control functionality 80; switch drivers 90; and an A/D converter 100. For each phase a voltage sensor 40 and a current sensor 50 is illustrated, however this is not meant to be limiting in any way, as will be particularly described further hereinbelow. Thyristors 21, 22 and 27 are associated with winding 35A; thyristors 23, 24 and 28 are associated with winding 35B and thyristors 25, 26 and 29 are associated with winding 35C.

Phase L1 is connected via first voltage sensor 40 and first current sensor 50 to a first end of winding 35A, phase L2 is connected via second voltage sensor 40 and second current sensor 50 to a first end of winding 35B and phase L3 is connected via third voltage sensor 40 and third current sensor 50 to a first end of winding 35C. Each voltage sensor 40 is arranged to provide an output reflective of the potential in relation to neutral or ground. The second end of winding 35A is connected to the anode of thyristor 21 and to the cathode of thyristor 22, the second end of winding 35B is connected to the anode of thyristor 23 and to the cathode of thyristor 24 and the second end of winding 35C is connected to the anode of thyristor 25 and to the cathode of thyristor 26. The cathode of thyristor 21 is connected to the anode of thyristor 22 and to the first end of winding 35C. The cathode of thyristor 23 is connected to the anode of thyristor 24 and to the first end of winding 35A. The cathode of thyristor 25 is connected to the anode of thyristor 26 and to the first end of winding 35B.

The second end of winding 35A is further connected to the anode of thyristor 27 and to the cathode of thyristor 29. The second end of winding 35B is further connected to the anode of thyristor 28 and to the cathode of thyristor 27. The second end of winding 35C is further connected to the anode of thyristor 29 and to the cathode of thyristor 28. The control inputs of each of thyristors 21-29 are independently responsive to a particular output of switch drivers 90.

The sense outputs of each voltage sensor 40 and current sensor 50 are connected to respective inputs of A/D converter 100. The outputs of A/D converter 100 are connected to master control unit 60 and master control unit 60 is in communication with each of cycloconverter functionality 70, phase control functionality 80 and switch drivers 90.

Semiconductor switching unit 20 is arranged such that in the event that thyristors 21-26 are enabled, and thyristors 27-29 are disabled, AC motor 30 is connected in a delta configuration, since the second end of each winding 35 is connected to the first end of a winding 35 associated with another phase. In the event that thyristors 21-26 are disabled, and thyristors 27-29 are enabled, AC motor 30 is connected in a star configuration. Additionally, as will be described further hereinto below, thyristors 21-29 are further operative responsive to each of cycloconverter functionality 70 and phase control functionality 80 to provide soft starting, controlled operation and braking. Semiconductor switching unit 20 is illustrated in an embodiment in which both delta/star switching is provided by the same thyristors as those providing soft starting, controlled operation and braking, however this is not meant to be limiting in any way. In another embodiment (not shown) a separate set of switches providing delta/start switching is provided, without exceeding the scope.

The above has been described as providing a voltage sensor 40 and a current sensor 50 for each phase L1, L2, L3, however as indicated above this is not meant to be limiting. In particular, in one embodiment only two voltage sensors 40 and two current sensors 50 are provided, with voltage and current information for the phase for which a voltage sensor 40 and/or current sensor 50 is not provided being calculated by master control unit 60 as:

$$u3=-u1-u2;\ i3=-i1-i2 \qquad \text{EQ. 1}$$

where the voltage for the phase where a voltage sensor 40 is not provided is denoted u3, and the voltages for the phases where a voltage sensor 40 is provided are denoted u1 and u2, respectively. Similarly, the current for the phase where a current sensor 50 is not provided is denoted i3, and the currents for the phases where a current sensor 50 is provided are denoted i1 and i2, respectively.

In operation, master control unit 60 receives instantaneous voltage and current information for each of first, second and third windings 35 from respective voltage sensors 40 and current sensors 50 via A/D converter 100. Responsive to the sensor data master control unit 60 is operative to calculate the orthogonal components of the stator current, denoted i1x and i1y. Particularly:

$$i1x=i1; i1y=-(i2-i3)/\sqrt{3} \qquad \text{EQ. 2}$$

where i1 is the current through winding 35A as sensed by first current sensor 50, i2 is the current through winding 35B as sensed by second current sensor 50 and i3 is the current through winding 35C as sensed by third current sensor 50. As indicated above in relation to EQ. 1, third voltage sensor 40 and third current sensor 50 are not required. Control unit 60 is further operative to calculate the orthogonal components of the stator voltage, denoted u1x and u1y. Particularly:

$$u1x=u35A; u1y=-(u35B-u35C)/\sqrt{3} \qquad \text{EQ. 3}$$

where u35A is the voltage across winding 35A as sensed by first voltage sensor 40, u35B is the voltage across winding 35B as sensed by second voltage sensor 40 and u35C is the voltage across winding 35C as sensed by third voltage sensor 40. In one embodiment voltage sensors 40 are respectively switched to directly sense the voltage across the respective winding 35, and in another embodiment the voltage across the respective winding 35 is determined responsive to the outputs of the respective voltage sensors 40.

Master control unit 60 is further operative to calculate the orthogonal components of the EMF of the stator, denoted e1x and e1y, responsive to the results of EQ. 2 and EQ. 3 as:

$$e1x=u1x-r1*i1x; e1y=u1y-r1*i1y \qquad \text{EQ. 4}$$

where r1 is the resistance of the stator. Master control unit 60 is further operative to calculate an estimation of the orthogonal components of the rotor's flux linkage vector, denoted ψ2x and ψ2y, responsive to the results of EQ. 4 as:

$$\Psi2x=-\int e1xdt; \Psi2y=-\int e1ydt \qquad \text{EQ. 5}$$

Master control unit 60 is preferably further operative to calculate an estimation of the rotor's flux linkage vector, denoted ψ2, responsive to the results of EQ. 5, as:

$$\psi2=\sqrt{((\Psi2x)^2+(\Psi2y)^2)} \qquad \text{EQ. 6}$$

Additionally, master control unit 60 is preferably further operative to calculate motor electromagnetic torque, denoted $T_E$, responsive to the result of EQ. 2 and EQ. 5, as:

$$T_E=3/2*p*(\Psi2x*i1y-\Psi2y*i1x) \qquad \text{EQ. 7}$$

where "p" denotes the number of motor pole sets.

Master control unit 60 is preferably further operative to calculate the EMF vector of the motor's rotor, denoted $\bar{e}2$, responsive to the results of EQ. 6, as:

$$\bar{e}2=\Psi2-\mu*X1*\bar{i} \qquad \text{EQ 8}$$

where μ represents the magnetic coupling index between windings of the stator and the rotor, and "X1" represents the inductive impedance of the stator's winding, both μ and X1 are input as a fixed constant of the target motor.

Master control unit 60 if further preferably operative to calculate the stator current, denoted $\bar{i}$, responsive to EQ. 2 as:

$$i\bar{i}=\sqrt{((i1y)^2+(i1x)^2)} \qquad \text{EQ. 9}$$

and to calculate the internal EMF vector of the stator, denoted E, responsive to EQ. 4, as:

$$E=\sqrt{((e1x)^2+(e1y)^2)} \qquad \text{EQ. 10}$$

Master control unit 60 is further preferably operative to calculate the rotation frequency of the rotor, denoted ω, responsive to EQ. 8, as:

$$\omega=\bar{e}2*Z \qquad \text{EQ. 11}$$

where Z is a motor specific scaling factor selected to scale the range of $\bar{e}2$ to the range of ω. Thus, the rotation frequency of the rotor ω is determined responsive to outputs of voltage sensors 40 and current sensors 50.

In an alternative embodiment, master control unit 60 is further preferably operative to calculate the difference between $T_E$ of EQ. 7 and the static load torque of the motor, denoted $T_S$, as:

$$T_E-T_S=J\,d\omega/dt \qquad \text{EQ. 12}$$

where J is the moment of inertia of the target motor, determined as $GD^2/4$, where $GD^2$ is also known as the flywheel moment. G is the mass of motor rotor, D is the average (or effective) diameter of the rotor, and $T_S$ is the static load torque of the target motor. $T_S$ may be one of a fixed value, a linear and a square law function from the rotation frequency of the rotor without exceeding the scope. The rotation frequency of the rotor, ω, may be further calculated as a function over time as:

$$\omega=\int d\omega/dt \qquad \text{EQ. 13}$$

Master control unit 60 is further operative to receive an input command indicating a target rotation frequency of the rotor, denoted ωref. In one embodiment control of the target motor speed is maintained responsive to the difference between ω and ωref responsive to one of EQ. 11 and EQ. 13. Closed loop control responsive to rotor rotation frequency is in one embodiment responsive to a proportional integral differential (PID) controller functionality. Preferably, stator current is further maintained within predetermined parameters, further preferably responsive to a proportional integral differential (PID) controller functionality or to a proportional integral (PI) controller functionality.

Figure 2:
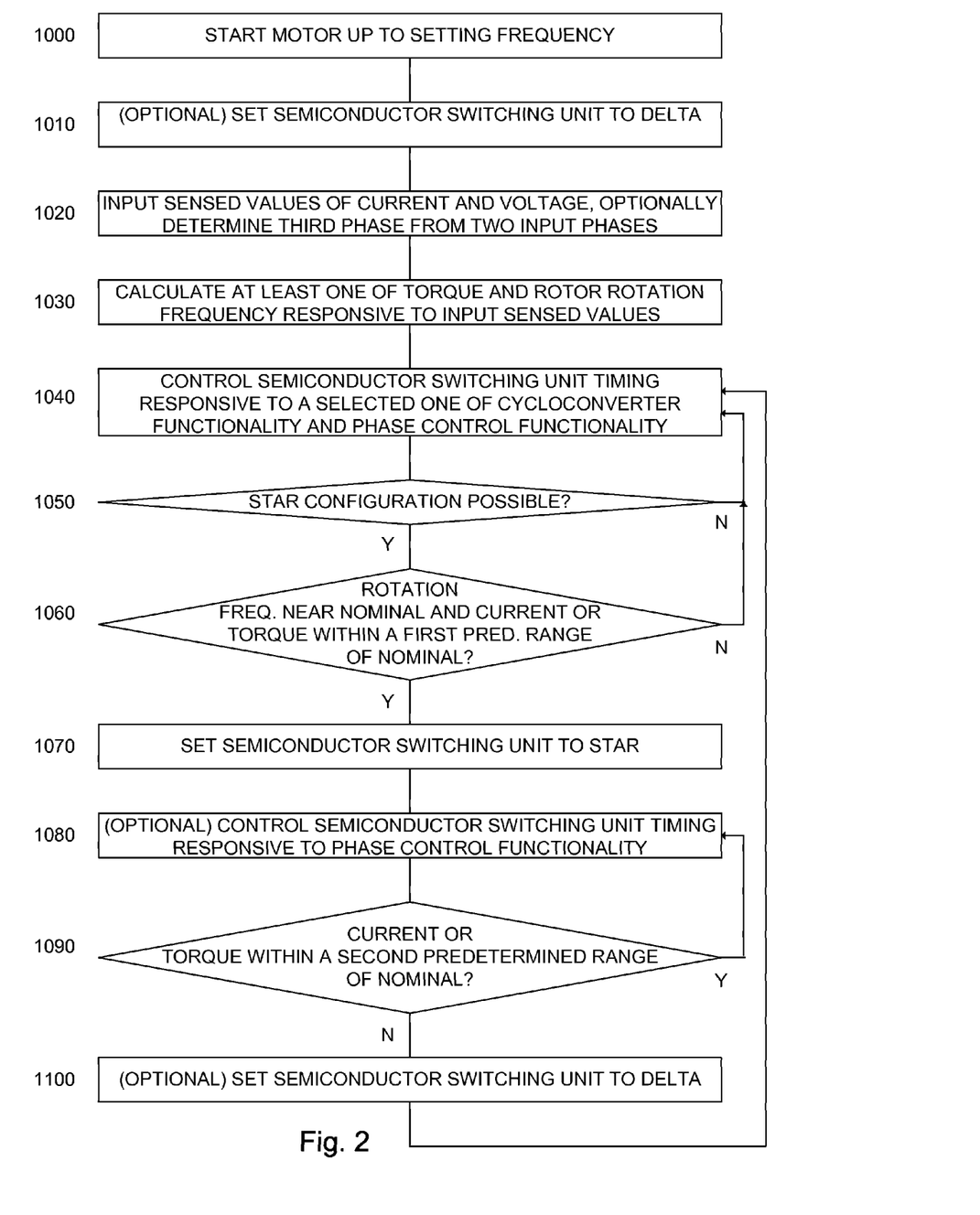
FIG. 2 illustrates a high level flow chart of an exemplary embodiment of the operation of the master control unit of the alternating motor controller of FIG. 1 to perform energy savings by switching between one of a delta and a star configuration.

Referring now to FIG. 2, the operation of master control unit 60 in accordance with an exemplary embodiment to perform energy savings by switching between one of a delta and a star configuration is described. In stage 1000, AC motor 30 is started up and accelerated to a set frequency, as will be described further below in relation to FIG. 3. In optional stage 1010 semiconductor switching unit 20 is set to connect AC motor 30 the three phase line connection L1, L2, L3 in a delta configuration. In particular, thyristors 21, 22, 23, 24, 25 and 26 are enabled, and thyristors 27, 28 and 29 are disabled. In stage 1020 sensed values of voltage and current are input, and optionally the third phase values are calculated responsive to EQ. 1.

In optional stage 1030 at least one of electromagnetic torque of the target motor and rotor rotation frequency are calculated responsive to the input values of stage 1010, as described above in relation to EQ. 2-EQ. 13.

In stage 1040 thyristors 21, 22, 23, 24, 25 and 26 are enabled and disabled responsive to a selected one of cycloconverter functionality 70 and phase control functionality 80. For rotational frequencies within a predetermined range of nominal, phase control functionality 80 is preferred, and for rational frequencies significantly outside of the range, i.e.

significantly below the nominal rotational frequency, in one non-limiting embodiment lower than about 80% of the nominal rotational frequency, the selection of the appropriate functionality is responsive to relative torque, denoted T* as:

$$T^* = Ts/Tn \qquad \text{EQ. 14}$$

Where Tn is defined as the nominal static load torque, and may be calculated in newtons/meter as:

$$Tn = 9550 * p * \pi/(30 * \omega) \qquad \text{EQ. 15}$$

In the event of a low T*, cycloconverter functionality 70 is preferred and in the event of a high T* phase control functionality 80 is preferred. The precise definitions of high and low are subject to actual motor conditions, and can be set based on measured energy savings for various conditions. In one non-limiting embodiment, the term low T* is defined as less than about 0.5.

It is to be noted that reducing the rotational frequency of AC motor 30, and reversing AC motor 30 are preferably performed via cycloconverter functionality 70. Braking of AC motor 30 may be performed by cycloconverter functionality 70, particularly by pulsing in phase voltages simultaneously to two of windings 35 while blocking electricity from the third winding 35. In another embodiment braking of AC motor 30 is performed by reducing the rotation frequency responsive to cycloconverter functionality 70, resulting in recuperative braking.

Cycloconverter functionality 70 is in one embodiment operative to produce a secondary frequency, denoted FS, different from the line frequency, denoted FL. Operation of the operative thyristors of semiconductor switching unit 20, in either the star or delta configuration, is responsive to secondary frequency FS. The resultant waveform exhibits a frequency of: FL-FS. By setting the timing of the resultant waveforms, the timing of the phases may exhibit a reverse relationship and thus reverse operation of AC motor 30 may be obtained.

In stage 1050 the configuration of AC motor 30 is checked to confirm that star configuration is possible. Preferably, the configuration information is input to master control unit 60 as part of an initial configuration stage. In the event that star configuration is not possible stage 1040 is performed.

In the event that in stage 1050 star configuration is possible, in stage 1060 the rotational frequency of the motor is checked to ensure that rotational frequency is within a predetermined range of nominal rotational frequency. The rotational frequency range is in one embodiment determined responsive to the calculated slip, as described in relation to EQ. 16 described hereinto below. Additionally one of: the sensed values of current of stage 1020, and the optionally calculated third phase values; and the calculated static load torque of the target motor of stage 1030 are compared with a first nominal static load torque value appropriate for setting one of delta configuration and star configuration. In an exemplary embodiment, as will be described further below in relation to FIGS. 6A-6C, static load torque equal to, or in excess of, about 60% is indicative that the star configuration will reduce energy consumption.

In the event that the compared sensed values are within the first predetermined range of nominal values appropriate for setting one of delta configuration and star configuration, in stage 1070 semiconductor switching unit 20 is set to a star configuration. In particular, thyristors 21, 22, 23, 24, 25 and 26 are disabled, and thyristors 27, 28 and 29 are enabled. In optional stage 1080, phase control functionality 80 is enabled and thyristors 27, 28 and 29 are enabled and disabled responsive to phase control functionality 80.

In stage 1090 one of: the sensed values of current of stage 1020, and the optionally calculated third phase values; and the calculated static load torque of the target motor of stage 1030 are compared with a second nominal static load torque value appropriate for setting one of delta configuration and star configuration. In an exemplary embodiment the second nominal electromagnetic torque value is selected to be sufficiently different from the first nominal electromagnetic torque value so as to provide the required hysteresis. In the event that the compared sensed values are outside of the second predetermined range of nominal values appropriate for setting one of delta configuration and star configuration, in stage 1100 semiconductor switching unit 20 is set to a delta configuration and stage 1040 is again performed. In the event that in stage 1090 the compared sensed values are within the second predetermined range of nominal values appropriate for setting one of delta configuration and star configuration, optional stage 1080 is performed. It is to be understood that in the event that rotational frequency of the motor is changed so that it is no longer within the predetermined range of nominal rotational frequency, stage 1100 is performed.

Figure 3:
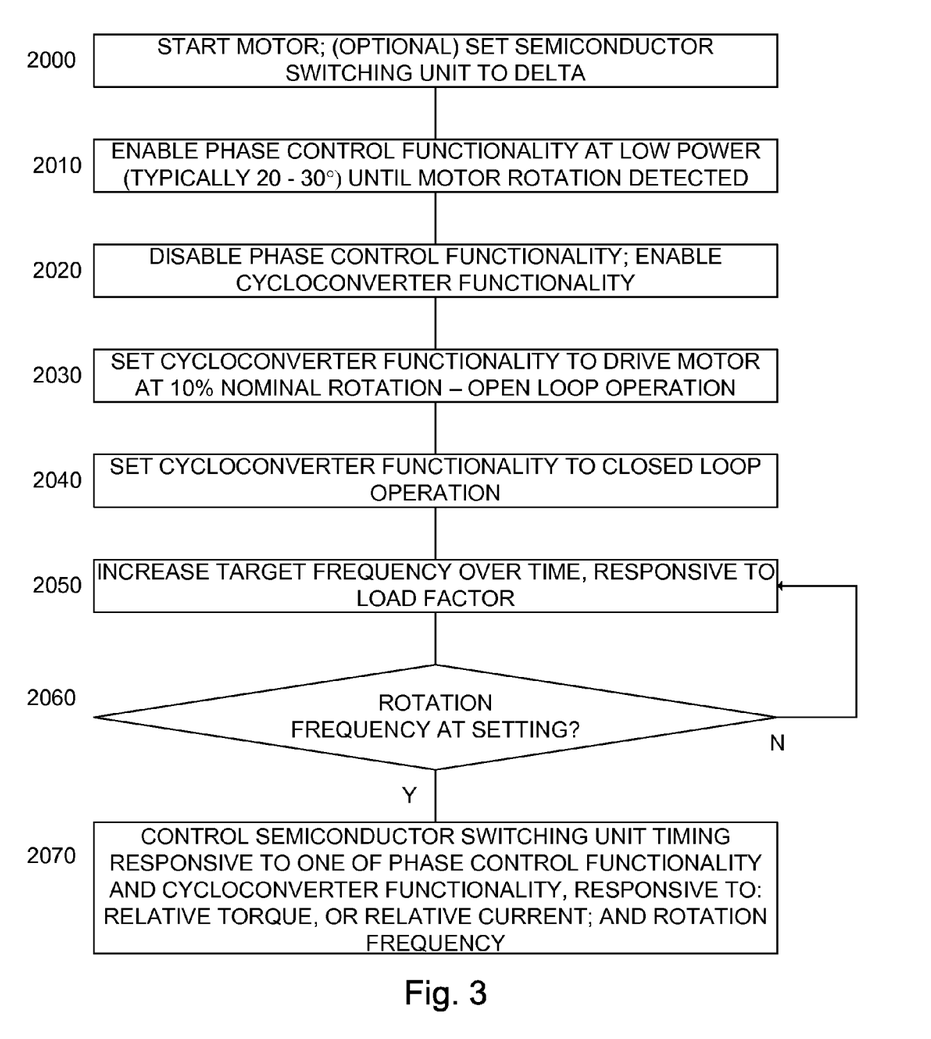
FIG. 3 illustrates a high level flow chart of an exemplary embodiment of the operation of the master control unit of the alternating motor controller of FIG. 1 to start up an AC motor.

FIG. 3 illustrates a high level flow chart of the operation of master control unit 60, according to an exemplary embodiment, to start up AC motor 30. In stage 2000, a command is received by master control unit 60 to start up AC motor 30. In one embodiment a target speed is input, and master control unit 60 is operative to detect that AC motor 30 is not in an operative state, responsive to the state machine status of master control unit 60 or the lack of current flow through AC motor 30 as detected by current sensors 50. Optionally, if the configuration of AC motor 30 allows such a connection, as indicated by an initial configuration setting, semiconductor switching unit 20 is set to the delta configuration.

In stage 2010, master control unit 60 is operative to enable phase control functionality 80 at low power operation, typically on the range of 20°-30°, in greater detail only the first 20°-30° of the AC power for each of the three phases L1, L2 and L3 are passed through the operative thyristors of switching control unit 20. The term 20°-30°, as will be described further below, refers to the conduction angle, denoted herein as α. In an exemplary embodiment, as described above in relation to stage 2000, start up is accomplished in a delta configuration and thus, as described above, thyristors 21-26 are operative, and thyristors 27-29 are disabled.

In stage 2020 master control unit 60 disables phase control functionality 80 and enables cycloconverter functionality 70. In stage 2030 cycloconverter functionality 80 is set, responsive to master control unit 60, to drive AC motor 30 at a predetermined rotation. In one embodiment, as illustrated, the predetermined rotation is 10% of nominal rotation speed, however this is not meant to be limiting in any way. In an exemplary embodiment, operation is by open loop operation until the target rotation speed is detected, preferably responsive to EQ. 11 or EQ. 13, described above.

In stage 2040, cycloconverter functionality 70 is set to closed loop operation responsive to master control unit 60. In stage 2050, master control unit 60 is operative to increase the rotational speed of AC motor 30 by adjusting the target rotational frequency over time towards the desired target rotational frequency. Cycloconverter functionality 70 is operative, as described above, to control the rotational speed of AC motor 30 responsive to the difference between ω and ωref, responsive to one of EQ. 11 or EQ. 13. Thus, increasing the target rotational frequency over time increases the rotational frequency of AC motor 30 over time. In one embodiment the target rotational frequency is increased linearly over time, and in another embodiment the target rotation frequency is increased non-linearly over time. Preferably, the selection of a linear or non-linear increase is responsive to initial configuration load parameters. In one embodiment a selection of one of: fixed, linear and square law static load torques, Ts, are provided, and the selection of linear or non-linear increase is responsive thereto.

In stage 2060, the rotation frequency is compared with the set predetermined rotation of stage 2020, and a determination is made as to whether the rotation frequency has reached the set, or target, value. In the event that the rotation frequency has reached the set value, in stage 2070 master control unit 60 enables one of cycloconverter functionality 70 and phase control functionality 80 responsive to: the relative torque, T* or relative current I*, and the rotation frequency ω., where I* is defined, per phase, as the current through the respective winding divided by the nominal current, as will be described further in relation to FIG. 4. In the event that in stage 2060 the rotation frequency has not reached the nominal operating value, stage 2050 as described above is maintained.

Figure 4:
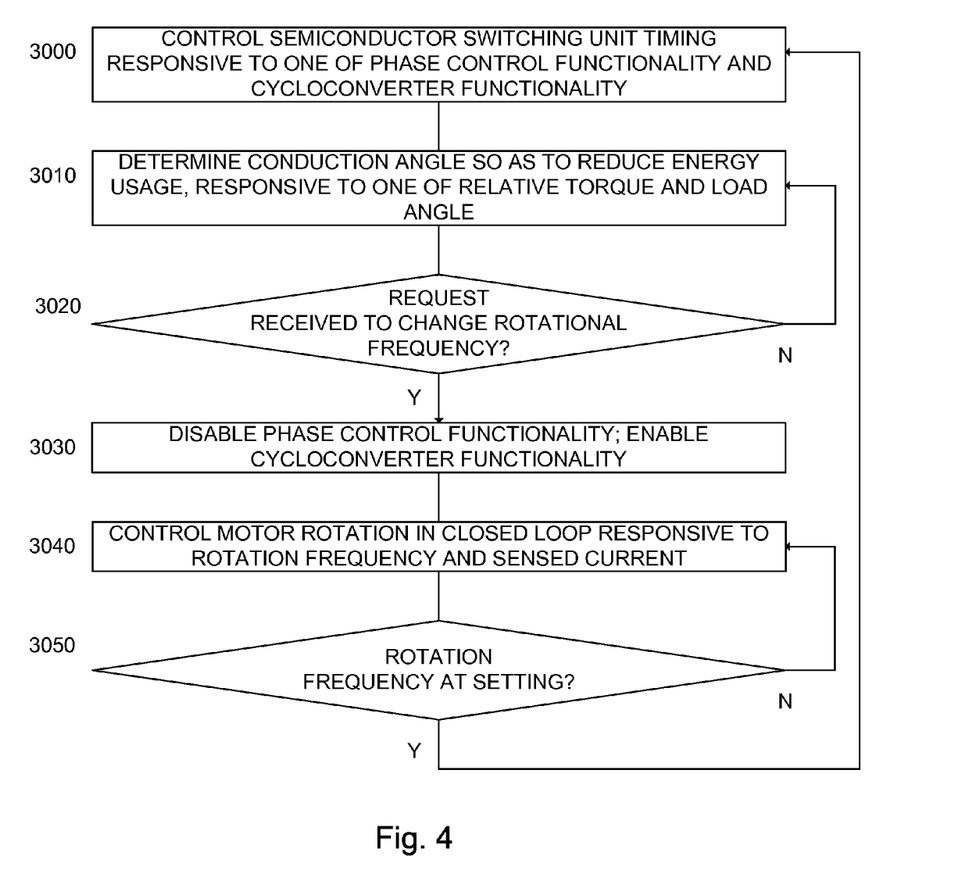
FIG. 4 illustrates a high level flow chart of an exemplary embodiment of the operation of the master control unit of the alternating motor controller of FIG. 1 in steady state operation.

FIG. 4 illustrates a high level flow chart of the operation of alternating current mode controller 10 in steady state operation. In stage 3000, master control unit 60 controls semiconductor switching unit 20 responsive to one of cycloconverter functionality 70 and phase control functionality 80, as described above in relation to stage 2070 and 1040.

In stage 3010, master control unit 60 determines the desired firing angle to reduce energy consumption responsive to one of the relative torque, T* and load angle. The firing angle, α, is defined as the time during which the operating thyristors pass current, and is also known as the conduction angle. A decreased conduction angle α results in a reduced effective RMS voltage across the respective winding 35, and an increased conduction angle α results in an increased effective RMS voltage across the respective winding 35 up to the nominal RMS line voltage. The conduction angle is preferably determined in a closed loop manner according to one of the two energy saving modes described below.

In particular, one of two energy saving modes is selected: a first energy savings mode responsive to the load angle and a second energy savings mode responsive to the relative torque and relative current. In an exemplary embodiment, the choice of energy savings mode is a user selectable condition, selected based on experienced energy savings during trials.

In the first energy savings mode, the conduction angle is calculated responsive to the angle between E and I1, preferably in accordance with EQ. 10 described above and EQ. 20 described hereinto below. In particular, the angle is maintained to be within a predetermined range, and the conduction angle is set to bring the angle between E and I1 to a preset point. In an exemplary embodiment the angle between E and I1 is maintained between 20° and 30°, with an optimal point selected based on experienced energy savings during trials.

Figure 5:
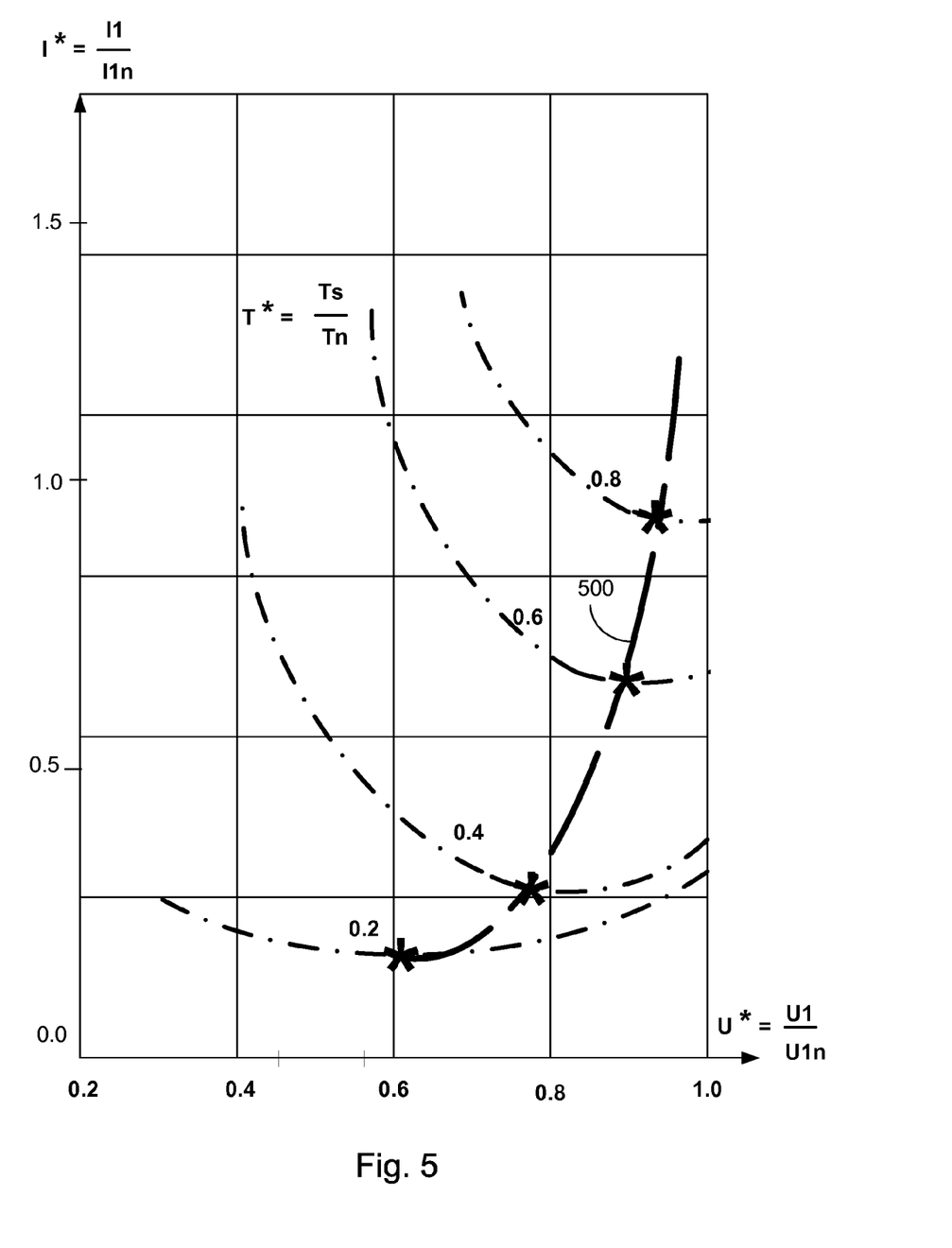
FIG. 5 illustrates a diagram of the relationship between relative current and relative voltage for various relative torques of an AC motor.

In the second energy savings mode, the conduction angle is calculated responsive the relative torque, as will be described further in relation to FIG. 5. FIG. 5 is a chart of relative current versus relative voltage of an exemplary AC motor 30 at a plurality of relative torques, in which the x-axis represents relative voltage of a single phase and the y-axis represents the relative current through the winding of the phase of the x-axis. The calculations are herein described in relation to a single phase, however a combination of the phase voltages and their respective currents may be utilized without exceeding the scope. Relative voltage is denoted U*, and is calculated as U1/U1n, i.e. the voltage across a particular winding 35 as compared with nominal voltage across that particular winding 35. Relative current is denoted I*, and is calculated as I1/I1n, i.e. the current through the particular winding 35 as compared with nominal current through the particular winding 35. Nominal phase voltage and current are found in the motor data sheet. U1, and I1, will be described further below.

A plurality of curves are illustrated, each representing a particular relative torque value, T*. In particular, the current vs. voltage behavior is illustrated for T* of 0.2; T* of 0.4; T* of 0.6 and T* of 0.8. It is to be noted that the curves are not linear, and show a clear minimum, which represents minimum power usage of AC motor 30 at the indicated relative torque. A curve 500 connecting the various minimums points is shown. Thus, conduction angle α is controlled to maintain voltage and resultant current to be at the minimum, responsive to the determined relative torque T*.

In particular, the appropriate values as illustrated in FIG. 5, are in one embodiment determined as follows. The motor slip, denoted s, is determined as:

$$s=(\omega_s-\omega)/\omega_s \quad \text{EQ. 16}$$

where $\omega_s$ is the angular synchronous speed, preferably in radians/second. For consistency, ω as described above in relation to EQ. 11 and EQ. 13 should similarly be defined in radians/second. $T_E$ is preferably calculated as:

$$T_E=3*R2*I2*U1/s*\omega_s*\sqrt{((R1+R2/s)^2+(X1+X2)^2)} \quad \text{EQ. 17}$$

which results in the same value as EQ. 7, preferably in Newtons/meter. EQ. 17 is preferred since its use makes closing of the loop simpler. In steady state:

$$Ts=T_E \quad \text{EQ. 18}$$

In explanation of EQ. 17: U1 is the phase voltage of the stator; R1 and X1 respectively represent the per phase resistance and inductive impedance of the stator windings; R2 and X2 respectively represent the per phase resistance and leakage reactance of the rotor windings as reflected to the stator windings. The rotor current, denoted above as I2 is determined as:

$$I2=U1/\sqrt{((R1+R2/s)^2+(X1+X2)^2)} \quad \text{EQ. 19}$$

I1, the phase current of the stator, and preferably expressed in amperes, is determined as:

$$I1=\sqrt{I2^2+I\mu^2} \quad \text{EQ. 20}$$

Iμ, as expressed in EQ. 20, is the magnetizing current of the motor, preferably expressed in ohms, and is determined as:

$$I\mu=U1/X\mu \quad \text{EQ. 21}$$

where Xμ is the magnetizing reactance of the motor. Preferably, each of R1, R2, X1, X2 and Xμ are expressed in ohms.

Thus, utilizing EQ. 16-EQ. 21, the value of T* can be determined dynamically, and the conduction angle can be adjusted so as to minimize motor power usage responsive to T*.

In stage 3020 an input to master control unit 60 is checked to determine if a change of rotational frequency is desired. In the event that a change in rotational frequency is desired, in stage 3030 master control unit 60 disables phase control functionality 80 and enables cycloconverter functionality 70. In stage 3040, master control unit 60 controls the rotation of AC motor 30 in a closed loop responsive to rotation frequency and sensed current. In particular, as described above, the sensed current is maintained within predetermined parameters, while closing the loop on rotation frequency. In one particular embodiment, sensed current is restricted to not exceed nominal current.

In stage 3050 the rotation frequency of AC motor 30 is compared with the set rotation frequency, as received in stage 3020. In the event that rotation frequency of AC motor 30 has arrived at the setting frequency, stage 3000 as described above is performed. In the event that in stage 3050 rotation frequency does not equal the set frequency, stage 3040 is again performed.

In the event that in stage 3020 a change of rotational frequency is not desired, stage 3010 as described above is maintained.

Figure 6A:
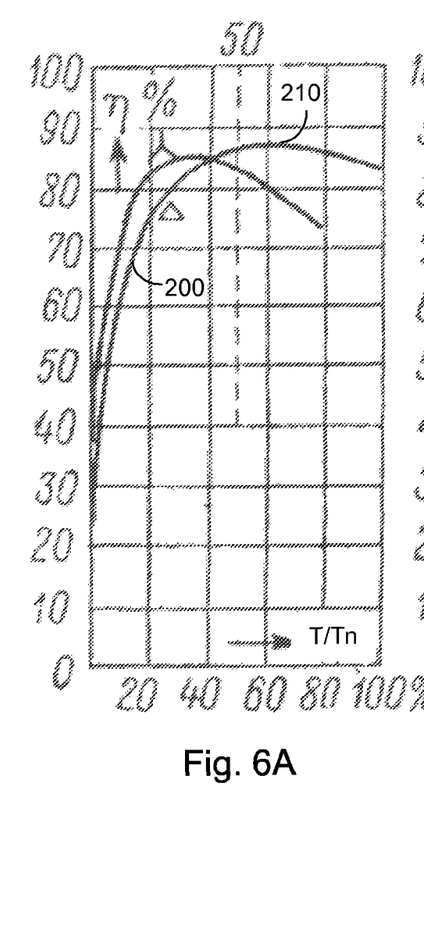
FIGS. 6A-6C illustrate the advantages of controlled switching between star and delta configurations as a function of torque factor.
Figure 6B:
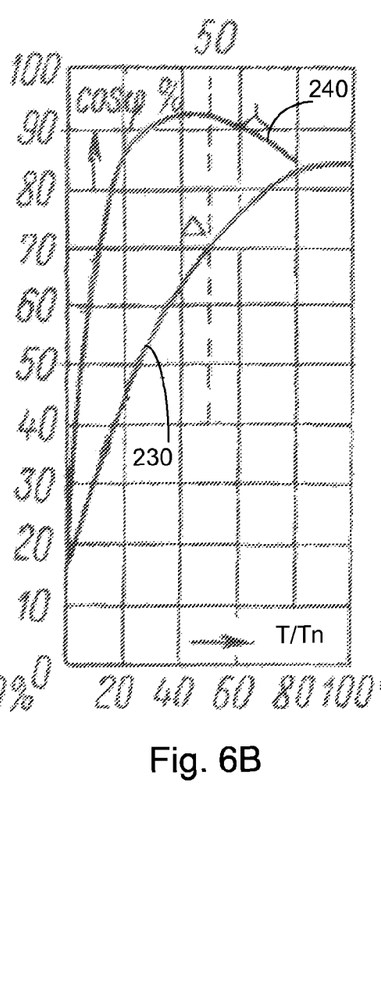
Figure 6C:
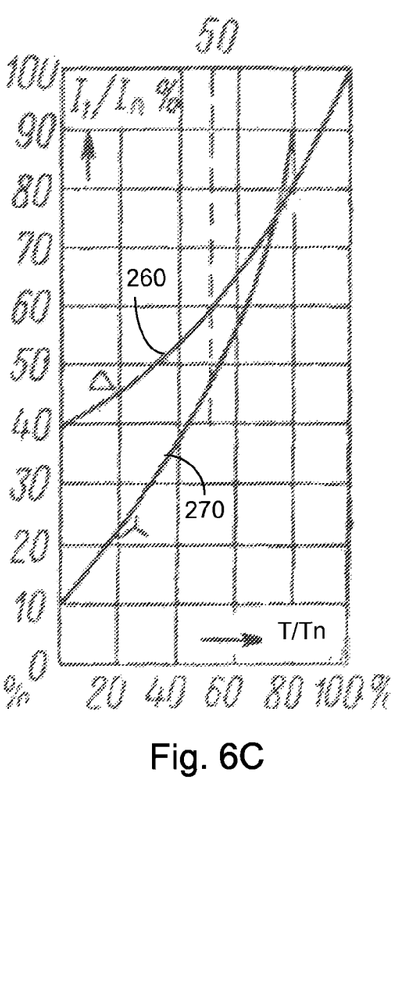

FIGS. 6A-6C illustrate the advantages of controlled switching between star and delta configurations as a function of torque factor, defined herein as the percentage of nominal torque. As indicated above in relation to EQ. 18, in steady state operation, electromagnetic torque is equal to static load torque.

FIG. 6A illustrates a graph of the efficiency of the target motor in one of a delta configuration and a star configuration over a range of electromagnetic torque factors, wherein the x-axis represents percentage of nominal electromagnetic torque and the y-axis represents normalized motor efficiency. Curve 200 represents the efficiency of AC motor 30 over a range of electromagnetic torque factors when connected in the delta configuration and curve 210 represents the efficiency of AC motor 30 over a range of electromagnetic torque factors when connected in the star configuration. At electromagnetic torque factors in excess of 50% AC motor 30 exhibits improved efficiency when connected in a delta configuration, whereas for electromagnetic torque factors below 50% AC motor 30 exhibits improved efficiency when connected in a star configuration.

FIG. 6B illustrates a graph of power factor of the target motor in one of a delta configuration and a star configuration over a range of electromagnetic torque factors, wherein the x-axis represents percentage of nominal electromagnetic torque and the y-axis represents normalized power factor, also known as COSφ. Curve 230 represents the power factor of AC motor 30 over a range of electromagnetic torque factors when connected in the delta configuration and curve 240 represents the power factor of AC motor 30 over a range of electromagnetic torque factors when connected in the star configuration. Power factor in excess of 80% is maintained by maintaining a star configuration for electromagnetic torque factors in between 20% and about 80% in a star configuration, whereas the delta configuration provides power factor in excess of 80% only for torque factors above 80%.

FIG. 6C illustrates a graph of current draw of the target motor in one of a delta configuration and a star configuration over a range of electromagnetic torque factors, wherein the x-axis represents percentage of nominal electromagnetic torque and the y-axis represents normalized current draw vs. nominal current draw. Curve 260 represents the normalized current draw of AC motor 30 over a range of electromagnetic torque factors when connected in the delta configuration and curve 270 represents the normalized current draw of AC motor 30 over a range of electromagnetic torque factors when connected in the star configuration. Normalized current draw of the star configuration is lower than that of the delta configuration for torque factors less than about 80%, whereas for increased torque factors the delta configuration shows a reduce normalized current draw.

Figure 7:
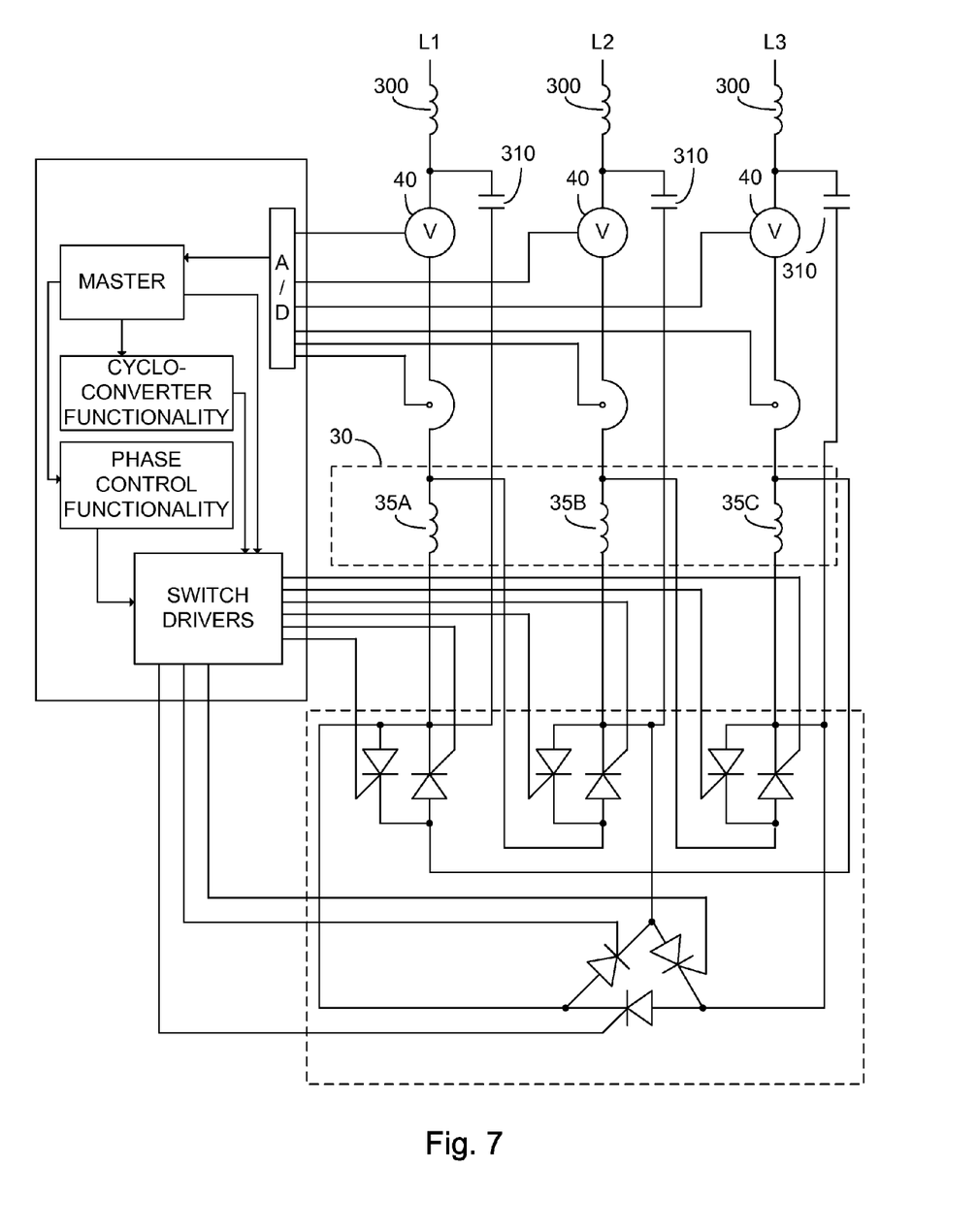
FIG. 7 illustrates a high level schematic diagram of a system in all respects similar to the system of FIG. 1, further exhibiting a passive filter.

FIG. 7 illustrates a high level schematic diagram of a system in all respects similar to the system of FIG. 1, further exhibiting a passive filter constituted of a choke 300 and a capacitor 310 for each line phase. In particular, a respective choke 300 is inserted between each of L1, L2 and L3 and the input side of the respective voltage sensor 40, representing a connection path to the first end of the respective winding 35, and a respective capacitor 310 is connected between the input side of the respective voltage sensor 40 to the second end of the respective winding 35.

The combination of choke 300 and capacitor 310 function as a filter to increase the motor efficiency during operation at rotational frequency less than nominal. In particular, the combination of choke 300 and capacitor 310 function to ensure current continuity in the stator windings during the time that the respective thyristor is cut off. The value of choke 300 is selected to limit the charging current for the respective capacitor 310 to acceptable levels. The value of capacitor 310 is selected responsive to the parameters of AC motor 30. In one particular embodiment, the value of each capacitor 310 is to be approximately $1/(\omega^2 *L)$, where L is the stator winding inductance.

Figure 8:
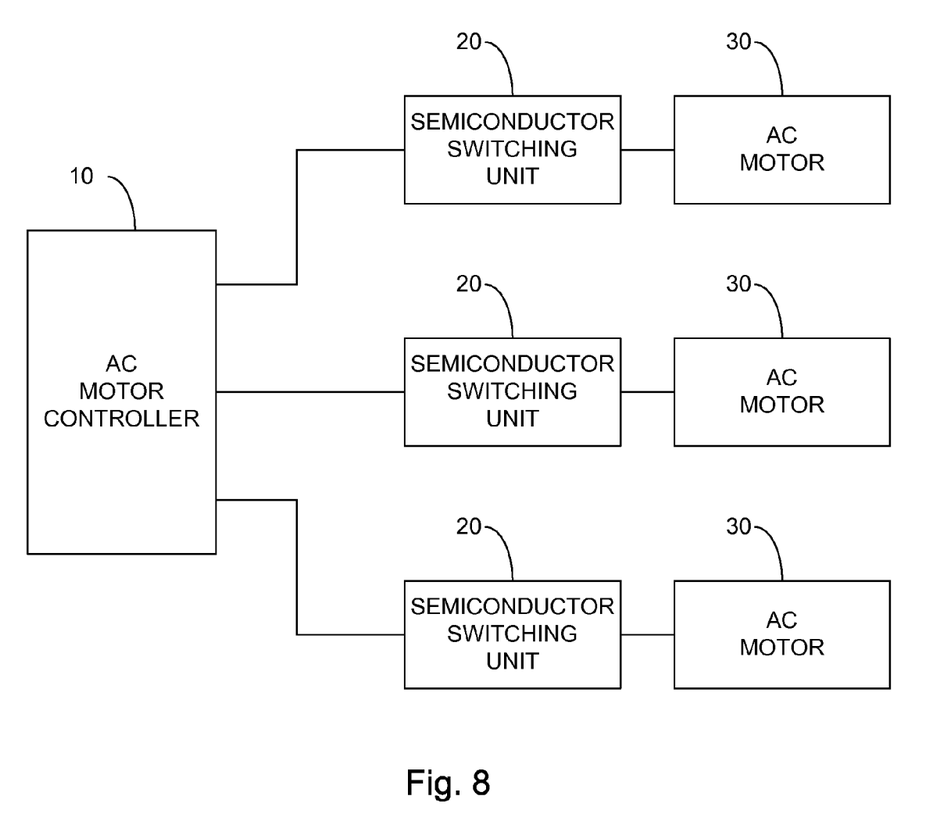
FIG. 8 illustrates a high level block diagram of a multi-motor embodiment in which a plurality of AC motors with respective semiconductor switching units are controlled by a single alternating motor controller.

The above has been described in an embodiment in which an alternating current motor controller 10 is provided for each semiconductor switching unit 20 and respective motor 30, however this is not meant to be limiting in any way. FIG. 8 illustrates a high level block diagram of a multi-motor embodiment in which a plurality of AC motors 30 with respective semiconductor switching units 20 are controlled by a single alternating current motor controller 10. Such an embodiment is advantageous for synchronization between various motors. In one particular embodiment shut down and start up of various motors in a large plant are synchronized to achieve power savings by operation from a single alternating motor controller 10.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

I claim:

1. An alternating current (AC) motor control system arranged to control a target AC motor, the target AC motor arranged to receive a three phase AC power, the target AC motor having: a first winding, a first end of the first winding arranged to be coupled to a first phase of the three phase AC power; a second winding, a first end of the second winding arranged to be coupled to a second phase of the three phase AC power; and a third winding, a first end of the third winding arranged to be coupled to a third phase of the three phase AC power, the AC motor control system comprising:
   a control unit;
   a cycloconverter functionality;
   a phase control functionality; and a semiconductor switching unit comprising a plurality of electronically controlled semiconductor switches each independently responsive to said control unit, said plurality of electronically controlled semiconductor switches comprising:
- a first pair of anti-parallel connected thyristors, a first end of said first pair arranged for connection to a second end of the first winding, and a second end of said first pair arranged for connection to the third phase of the three phase AC power;
- a second pair of anti-parallel connected thyristors, a first end of said second pair arranged for connection to a second end of the second winding, and a second end of said second pair arranged for connection to the first phase of the three phase AC power; and
- a third pair of anti-parallel connected thyristors, a first end of said third pair arranged for connection to a second end of the third winding, and a second end of said third pair arranged for connection to the second phase of the three phase AC power,
- said control unit arranged to modulate the conduction period of said first pair, said second pair and said third pair responsive to a selectable one of said phase control functionality and said cycloconverter functionality.

2. The alternating current motor control system of claim 1, wherein said semiconductor switching unit further comprises 3 additional thyristors, each of the 3 additional thyristors associated with a particular one of the phases of the three phase AC power, said 3 additional thyristors arranged to connect the windings of the target AC motor to the three phase AC power in one of a star and a delta configuration responsive to said control unit.

3. The alternating current motor control system of claim 2, wherein said control unit is arranged in an operating condition of the target AC motor to set said 3 additional thyristors of said semiconductor switching unit to connect the windings of the target AC motor to the star configuration responsive to a predetermined condition of the rotational frequency and one of the current through two windings of the target AC motor and a static load torque of the target AC motor.

4. The alternating current motor control system of claim 3, wherein said control unit is arranged in an operating condition of the target AC motor to set said 3 additional thyristors of said semiconductor switching unit to connect the windings of the target AC motor to the delta configuration responsive to the absence of said predetermined condition.

5. The alternating current motor control system of claim 2, wherein said control unit is arranged in a start up condition of the target AC motor to:
- select the cycloconverter functionality so as to modulate the conduction period of said first pair, said second pair and said third pair of electronically controlled semiconductor switches responsive to said selected cycloconverter functionality.

6. The alternating current motor control system of claim 5, wherein said control unit is further arranged in a start up condition of the target AC motor to:
- set said 3 additional thyristors of said semiconductor switching unit to connect the windings of the alternating current motor to the three phase AC power in the delta configuration.

7. The alternating current motor control system of claim 1, wherein said control unit is arranged in an operating condition of the target AC motor to:
- compare the rotational frequency of the target AC motor with a set value; and
- in the event that said rotational frequency of the target AC motor is not equal to said set value, select the cycloconverter functionality so as to modulate the conduction period of said first pair, said second pair and said third pair of electronically controlled semiconductor switches responsive to said selected cycloconverter functionality.

8. The alternating current motor control system of claim 1, wherein said phase control functionality is arranged when selected in an operating condition of the target AC motor to modulate the conduction angle of said first pair, said second pair and said third pair of electronically controlled semiconductor switches so as to reduce energy consumption responsive to the relative torque.

9. The alternating current motor control system of claim 1, wherein said phase control functionality is arranged when selected in an operating condition of the target AC motor to modulate the conduction angle of said first pair, said second pair and said third pair of electronically controlled semiconductor switches, when selected, so as to reduce energy consumption responsive to the angle between an electromagnetic force vector of the target AC motor stator and a phase current of the target AC motor stator.

10. The alternating current motor control system of claim 1, further comprising:
- a means for receiving an indication of current through at least two of the windings of the target AC motor; and
- a means for receiving an indication of a voltage potential associated with said at least two windings of the target AC motor, said control unit further arranged to control said semiconductor switching unit responsive to said received indications of current and received indications of voltage potential.

11. The alternating current motor control system of claim 1, further comprising a passive filter arranged in parallel with each of the first, second and third windings of the target alternating current motor.

12. A method of controlling an alternating current three phase motor, the method comprising:
- providing a controller exhibiting a cycloconverter functionality and a phase control functionality;
- providing a semiconductor based switchable connection to a three phase power; and
- modulating the conduction period of the constituent switches of said provided semiconductor based switchable connection responsive to a selectable one of said provided cycloconverter functionality and said provided phase control functionality.

13. The method of claim 12, further comprising:
- setting said switchable connection to connect the alternating current three phase motor to the three phase power in a star configuration responsive to a predetermined condition of the rotational frequency and one of the winding current and static load torque.

14. The method of claim 13, further comprising:
- setting said switchable connection to connect the alternating current three phase motor to the three phase power in a delta configuration responsive to the absence of said predetermined condition of the rotational frequency and one of the winding current and static load torque.

15. The method of claim 12, further comprising in a start up condition of the alternating current three phase motor:
- modulating the conduction period of the constituent switches of said provided semiconductor based switchable connection responsive to said provided cycloconverter functionality.

16. The method of claim 15, further comprising in the start up condition of the alternating current three phase motor:

setting said switchable connection to connect the alternating current three phase motor to the three phase power in a delta configuration.

17. The method of claim 12, further comprising in an operating condition of the alternating current three phase motor:
comparing the rotational frequency of the target alternating current motor with a set value; and
in the event that said rotational frequency of the target alternating current motor is not equal to said set value,
modulating the conduction period of the constituent switches of said provided semiconductor based switchable connection responsive to said provided cycloconverter functionality.

18. The method of claim 12, further comprising in an operating condition of the alternating current three phase motor:
modulating the conduction period of the constituent switches of said provided semiconductor based switchable connection responsive to said provided phase control functionality responsive to the relative torque.

19. The method of claim 12, further comprising in an operating condition of the alternating current three phase motor:
modulating the conduction period of the constituent switches of said provided semiconductor based switchable connection responsive to said provided phase control functionality responsive to the angle between the electromagnetic vector of the stator and the phase current of the stator.

20. The method of claim 12, further comprising filtering the voltage across the windings of the alternating current three phase motor.

* * * * *